Patented Nov. 20, 1934

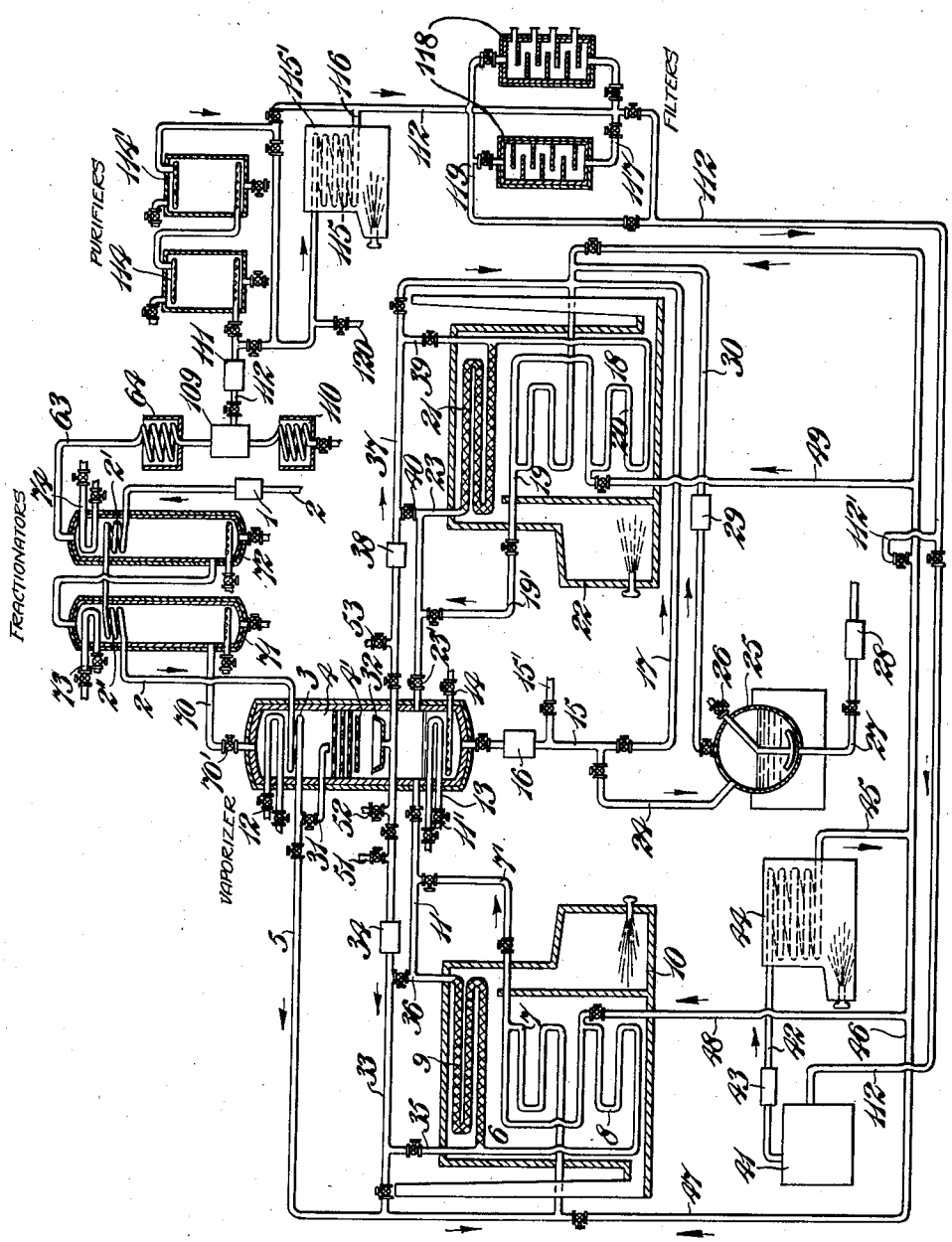

1,981,727

UNITED STATES PATENT OFFICE 1,981,727

ART OF AND APPARATUS FOR CONVERTING HYDROCARBONS

William L. Gomory, Paris, France, assignor to Standard Oil Development Company, a corporation of Delaware Application August 13, 1930, Serial No. 475,102
In Great Britain July 15, 1930

3 Claims. (Cl. 196—53)

This invention relates to an improved process and apparatus for converting heavy hydrocarbons into lighter hydrocarbons and more particularly to the production of low-boiling oils from heavy oils.

According to my invention the oil to be treated is subjected to cracking conditions of temperature, pressure and time in a coil from which the cracked products are passed into a vaporizing zone under reduced pressure and the residue from the vaporizing zone is subjected to cracking conditions of temperature, pressure and time in a second coil from which the cracked products are discharged into said vaporizing zone.

The residue from the vaporizing zone may advantageously be treated in the second coil in admixture with hydrogen or hydrogen-containing gas or gas capable of liberating hydrogen or in the presence of substances capable of liberating hydrogen, hydrogen-containing gas, or gaseous hydrocarbons, and in the presence or absence of catalysts. Substances capable of liberating hydrogen or hydrogen containing gas or hydrocarbon gases which may be used are for instance: steam and iron, water and alkali metals, naphthenes in the presence of nickel, water and carbide, natural gas, coal gas, hexamethylene in the presence of porous porcelain, etc. All of these alternatives, either singly or in any desired combination will be hereinafter referred to as "hydrogen".

If desired, the oil may be treated in a coil in admixture with "hydrogen", the products being passed under reduced pressure into a vaporizing zone, e. g. an evaporator, the residue from the vaporizing zone being subjected to cracking conditions of temperature, pressure and time in a second coil from which the products are discharged into the said vaporizing zone. The residue from the vaporizing zone is advantageously treated in the second coil in admixture with "hydrogen", so that both the original oil and the residue obtained in the vaporizing zone are destructively hydrogenated.

According to one form of my improved process the oil is subjected to cracking conditions of temperature, pressure and time in a coil from which the products are discharged under reduced pressure into a vaporizing zone in which a reflux condensate is recovered. This reflux condensate is subjected to cracking conditions of temperature, pressure and time in a second coil from which the products are discharged into said vaporizing zone. The vapours and residue are separately removed from the vaporizing zone and the residue is subjected to destructive hydrogenation.

In this modification of my process the reflux condensate may be subjected to cracking conditions of temperature, pressure and time in the presence of "hydrogen" or the original oil may be treated in the presence of "hydrogen", or both original oil and the reflux condensate may be treated in the presence of "hydrogen".

According to another form of my improved process, the oil is subjected to cracking conditions of temperature, pressure and time in a coil from which the products are discharged under reduced pressure into a vaporizing zone and the residue from the vaporizing zone is subjected to a second vaporization, the vapours, so obtained being subjected to cracking conditions of temperature, pressure and time in a second coil from which the products are discharged into the primary vaporizing zone. The residue obtained in the second vaporization is advantageously subjected to destructive hydrogenation.

A reflux condensate is recovered in the primary vaporizing zone and is returned in heated condition either to the inlet of the first coil or cracking zone or to the inlet of the second coil or cracking zone, or the reflux condensate may be returned to various intermediate points of the first coil or of the second coil, or it may be introduced into the stream of products passing from the first coil or second coil into the primary vaporizing zone. The reflux condensate may also be introduced at any two or more of the positions above mentioned simultaneously.

According to a further form of my improved process the oil to be treated is passed into a vaporizing zone, from which vapours and reflux condensate are recovered, the reflux condensate is subjected to cracking conditions of temperature, pressure and time, in a coil, the products being discharged under reduced pressure into the vaporizing zone, the residue from which is subjected to cracking conditions of temperature, pressure and time in a second coil and the products from the second coil are discharged into the said vaporizing zone. If desired, the reflux condensate may be treated in the first coil in admixture with "hydrogen", or the residue from the vaporizing zone may be treated in the second coil in admixture with "hydrogen". Or, advantageously, the reflux condensate is treated in the first coil in admixture with "hydrogen", and the residue from the vaporizing zone is treated in the second coil also in admixture with "hydrogen".

According to a still further modification of my improved process the oil to be treated is passed into a vaporizing zone from which vapours and reflux condensate are recovered, the reflux condensate is subjected to cracking conditions of temperature, pressure and time in a coil from which the products are discharged under reduced pressure into the vaporizing zone, and the residue from said vaporizing zone is subjected to a second vaporization, the vapours from said second vaporization being subjected to cracking conditions of temperature, pressure and time in a second coil from which the products are discharged into said vaporizing zone. If desired, the reflux condensate may be treated in the first coil in admixture with "hydrogen" or the vapours from the second vaporization may be treated in the second coil in admixture with "hydrogen". Moreover, the reflux condensate may be cracked in the first coil in admixture with "hydrogen" and the residue from the second vaporization may be cracked in the second coil also in admixture with "hydrogen", the products from both the first and second coils being discharged into the primary vaporizing zone under reduced pressure. The residue obtained from the second vaporization is advantageously subjected to destructive hydrogenation.

In all the modifications of my process in which the oil to be treated is subjected to vaporization, if desired, the oil may be passed under pressure through an auxiliary heating zone, preferably in the form of a coil, as shown in the specifications of my co-pending applications of Serial Numbers 475,105; 475,099; 475,100, and 475,101.

According to yet another modification of my improved process the oil to be treated is subjected to cracking conditions of temperature, pressure and time in a cracking zone and the products are vaporized in a vaporizing zone, the residue from which is subjected to a second vaporization at atmospheric or super-atmospheric pressure, and the vapours obtained from the second vaporization are subjected to cracking conditions of temperature, pressure and time in a second cracking zone and the resulting products are introduced into the primary vaporizing zone from which the vapours are removed and recovered, the final residue from the secondary vaporizing zone being withdrawn and, if desired, subjected to destructive hydrogenation. A reflux condensate is advantageously recovered from the primary vaporizing zone and such reflux condensate is returned either to the inlet of the first cracking zone or to the inlet of the second cracking zone. Or such reflux condensate may be introduced into the stream of products passing from the first or second cracking zones into the primary vaporizing zone, or the reflux condensate may be introduced at various intermediate points of the first coil or of the second coil. The reflux condensate may moreover be introduced at any two or more of the above positions simultaneously. Furthermore, part of the oil passing through the coils may be taken from an intermediate point of the coils and introduced into the stream of products passing to the evaporator in order to regulate the temperature thereof.

The quantity of reflux condensate introduced into the streams of products passing from the cracking zones to the primary vaporizing zone is advantageously so regulated that it will control the temperature of the streams entering the vaporizing zone.

In all the above forms of my improved process in which a reflux condensate is recovered from the primary vaporizing zone and is returned to various positions in the first or second cracking zones or both, the reflux condensate, prior to its introduction into the cracking zones, is advantageously subjected to distillation in order to separate the sufficiently converted products therefrom.

Moreover, in all the above forms of my improved process, vapours are removed from the primary vaporizing zone and subjected to fractional condensation. For example, such vapours may be separated into good end-point gasoline and other valuable fractions by passing them through a fractionator or fractionators provided with controlled cooling, such cooling being effected by the feed oil or by means independent thereof. The reflux condensate obtained in the fractionator or fractionators may be introduced into the primary vaporizing zone for redistillation.

Moreover, in cases where the reflux condensate is subjected to distillation prior to its return to the cracking zones, the light vapours separated from the reflux condensate may be introduced into the fractionator or fractionators either separately or together with the vapours obtained in the primary vaporizing zone. Or if desired such light vapours may be introduced into the primary vaporizing zone. Moreover, the light vapours obtained from the reflux condensate may be partly introduced into the primary vaporizing zone, e. g. the heavier fractions, and partly into the fractionator or fractionators, e. g. the lighter fractions. Or the said light vapours may be fractionated in a separate fractionator.

The "hydrogen" under pressure and in heated condition may be introduced into the inlet end of either of the cracking zones or it may be introduced at an intermediate point or points of said cracking zones.

The "hydrogen" may also be simultaneously introduced into the inlet end and at various points of said cracking zones.

The incondensible gas formed during the treatment is separated from the condensed low-boiling oils and is advantageously used as a make-up gas in the hydrogenation treatment.

A novel feature of my invention comprises subjecting the uncondensed vapours and gases obtained in any one of the modifications of my process to dissociation, and utilizing the dissociated vapours and gases in the destructive hydrogenation of hydrocarbons.

Moreover my invention broadly covers the process which comprises dissociating gaseous hydrocarbons or hydrocarbon vapours, such as, for instance, natural gas or refinery gas, etc. and subjecting them mixed with hydrocarbon oil to destructive hydrogenating conditions of temperature, pressure and time.

Generally speaking different pressure conditions may be maintained in the various parts of the system.

The present invention also comprises suitable apparatus for carrying into practice the several forms of my improved process.

In order that the invention may be fully understood, reference will be made to the accompanying drawing which illustrates in diagrammatic form suitable apparatus for carrying my improved process into practice.

Referring to the drawing, the oil to be treated is forced by pump 1 through line 2 and cooling coils 2', 2" into cooling coil 3 which is located in the upper portion of the evaporator 4, the preheated oil then flowing under pressure through line 5 to the inlet of the heating and cracking coil 6. The coil 6 comprises three pipe sections 7, 8 and 9 which are located in different positions in a furnace setting 10.

The products are discharged from the coil 6 through line 11 having a pressure control valve 11' into the lower portion of the evaporator 4 and the products are separated therein into residue, reflux condensate and uncondensed vapour. The evaporator is provided with a controlled cooling and, in addition to cooling coil 3, a further cooling coil 12 is provided so that the cooling may be effected by means which are independent of the supply of feed oil.

The separation of the desirable overhead products from the residue in the evaporator 4 may be assisted by steam coil 14 through which live steam is introduced whilst additional heat may be provided by heating coil 13. Baffle plates 4' are suitably disposed within the evaporator 4 to ensure a thorough intermingling of ascending vapour with descending liquid and the evaporator is advantageously heat-insulated. The temperature in the evaporator is so regulated that the fractions which consist mainly of gasoline, naphtha and kerosene leave the evaporator as vapours through line 70, whilst heavier fractions are condensed therein to form reflux condensate and residue.

The residue is withdrawn from the evaporator 4 through line 15 by a pump 16 and such residue may be withdrawn through line 15' to be destructively hydrogenated or passed through line 17 to the inlet of a heating and cracking coil 18 which comprises three pipe sections 19, 20, 21 which are located in different parts of a furnace setting 22. The heating and cracking coils may advantageously be built up of a series of straight pipes in accordance with standard practice, e. g. with the ends of the pipes extending through the flue walls and suitably connected by headers having apertures provided with removable plugs to permit inspection of the pipes. The treated products from coil 18 are discharged into the lower portion of the evaporator 4 through line 23 having a pressure control valve 23'.

Or, the residue withdrawn from the evaporator 4 may be passed through line 24 into an auxiliary evaporator 25 and thus subjected to a second vaporization. The auxiliary evaporator 25 may be heated by the injection of steam through spray pipe 26 or by direct heat or both. Final residue is withdrawn from the auxiliary evaporator through line 27 by means of pump 28 and may be subjected to a destructive hydrogenation treatment. Vapours are withdrawn from the auxiliary evaporator by pump 29 and passed through line 30 to the inlet of the heating and cracking coil 18 from which the treated products are passed to the primary evaporator 4 through line 23.

Reflux condensate formed in the evaporator is collected in a pan 32 and may be returned through line 33 by means of pump 34 to the inlet of the heating and cracking coil 6 or to an intermediate point thereof through line 35. Or the reflux condensate may be introduced through valve 36 into the stream of cracked products passing from coil 6 to the evaporator 4. Such reflux condensate may also be passed through line 37 by means of pump 38, to the inlet of the heating and cracking coil 18 or to an intermediate point thereof through line 39, or it may be passed through valve 40 into the stream of products passing from coil 18 to the evaporator 4.

Vapours are withdrawn from the evaporator 4 through line 70 having a pressure control valve 70' and are passed to a preferably heat-insulated fractionator or fractionators 71, 72 for direct separation into fractions having the desired boiling range. Cooling coils 2', 2" are provided in the upper portions of the fractionators through which the feed oil is passed and thus preheated, whilst additional cooling coils 73, 74 are provided therein to provide cooling means which are independent of the supply of feed oil.

The arrangement of the fractionators and their operation are more fully shown and described in my co-pending specifications Serial Numbers 475,105, 475,099, 475,100, 475,101 and 475,103 filed August 13, 1930.

Vapours and gases from fractionator 72 are withdrawn through line 63 to condenser 64.

Incondensible gas is separated from condensed vapours in separation drum 109, the condensate flowing through cooler 110 to a receiver (not shown).

The incondensible gas including excess hydrogen, prior to its return to the system through pump 111 and line 112, is purified in purifiers 114 and 114'.

Preferably the hydrocarbon vapours and gases, before being returned to the hydrogenating system, are subjected to optimum dissociating conditions in dissociating furnace coil 115, which is arranged in a suitable furnace setting 115'.

Hydrocarbon vapours and gases, refinery gases or natural gas, etc., can be introduced into the dissociating apparatus 115, 115' to be subjected to dissociation from an outside source through line 120.

Electric arc furnace can be advantageously used in cases in which very high temperatures are necessary for the dissociation.

The dissociation treatment of these gases is accomplished at various temperatures and pressures and in some cases in the presence of various catalysts depending upon the composition of the gas and vapour mixture and the chemical nature of the components. In some cases temperatures as high as 1800–2200° F. are needed to obtain satisfactory results.

The dissociated gases are passed through branch line 116, line 112 and branch line 117 through gas-filters 118 to remove suspended impurities such as carbon (carbon black) from the gas before the same is returned through lines 119 and 112 to gas supply 41 or gas manifold 46 through branch line 112'.

The oil to be treated may be passed directly or through a heated zone such as is described in my co-pending application Ser. No. 475,101 into the evaporator 4 through branch line 31, the reflux condensate from pan 32 being passed through line 33 to the inlet of the heating and cracking coil 6.

In cases where it is desired to subject the reflux condensate from pan 32 to distillation prior to its return to the cracking zones, such reflux condensate is withdrawn through line 52 and passed to a re-run still (not shown) for the removal of the light fractions contained in the reflux condensate, the residue from such still being returned to any desired position in the cracking zones through lines 51 and 53. Steam may be injected into the re-run still and the still may be heated by direct heat or otherwise. The operation and arrangement of the re-run still may be as described in my co-pending application Serial Number 475,101.

In cases where it is desired to pass the oil through the coils 6 and 18 in admixture with "hydrogen", such gas is withdrawn from a suitable source of supply 41 by means of a pump 43 and is passed through line 42 to a heater 44. The heated gas flows from the heater 44 through line 45 to a manifold 46. Gas from manifold 46 may be passed to the inlet of the coil 6 through line 47, or to an intermediate point thereof through line 48 or the gas may pass through line 50 to the inlet of the coil 18 or to an intermediate point thereof through line 49. The pipe sections 9, 21 of the coils 6, 18 may contain suitable hydrogenating catalysts and may be of larger diameter than the pipe sections 7, 8 and 19, 20. The catalysts and/or the substances capable of liberating hydrogen or hydrogen-containing gas or hydrocarbon gases can be employed in suspension or in colloidal solution and thus circulated through the system together with the material to be treated.

Valves are suitably disposed throughout the apparatus to control the flow of oil and gas to the different parts of the system and to enable any desired pressure to be maintained therein, whilst all the lines conveying hot oil are heat-insulated. All the lines conveying oil and gas into the heating and cracking coils are provided with check valves to prevent the hot products from backing into these lines.

In the operation of my improved process the oil is advantageously heated to a temperature between the approximate limits of 750° to 1500° F. in the coils 6 and 18 under a pressure of from 50 to 3000 lbs. per square inch or more.

The temperature of the oil in the lower portion of the evaporator 4 is advantageously maintained at about 600° F. by the introduction of a regulated amount of reflux condensate or part of the oil from an intermediate point of the coils into the streams of products entering the evaporator. The pressure in the evaporator 4 is maintained at a lower value than that in the heating and cracking coils, and may be atmospheric pressure.

The residue from the evaporator 4 is heated in the auxiliary evaporator 25 to a temperature of 800° F. or higher at atmospheric or super-atmospheric pressure.

In cases where the feed oil is passed directly into the evaporator 4, the feed oil is preferably heated by passing it through an auxiliary heating coil which may be situated in the same furnace as that in which the coil 6 or the coil 18 is located, though independent heating means may be used as shown in my co-pending application Serial No. 475,101. The feed oil is heated in the auxiliary heater to such a temperature that desirable light products are obtained therefrom in the evaporator 4.

I claim:—

1. Apparatus of the character described comprising a heating and converting means adapted for heating and maintaining oil at cracking temperature and under pressure and means for supplying oil under pressure to the inlet of the heating and converting means, vaporizing means into which the products from said heating and converting means are discharged under reduced pressure, the said vaporizing means being provided with means for recovering and separately withdrawing vapors, reflux-condensate and residue and being also provided with cooling means in the top and heating means in the bottom thereof, a plurality of means for successively receiving fractionating and condensing vapors from said vaporizing means and also for receiving charging oil to cause the latter to flow in counter-current direction to said vapors and to be delivered through the above mentioned cooling means located in said vaporizing means to said heating and converting means, means for passing charging oil directly into said vaporizing means, a distilling means connected to said vaporizing means for receiving residue from said vaporizing means and provided with means for removing vapors and residue, a second heating and converting means adapted for heating and maintaining oil at cracking temperature and under pressure, means for supplying vapors from said distilling means to said second heating and converting means, means for discharging products from said second heating and converting means into said vaporizing means, means for supplying reflux-condensate obtained in said vaporizing means to the inlets and outlets of both of said heating and converting means and to intermediate points thereof, means to discharge oil from an intermediate point of both of said heating and converting means into the streams of products passing from both of said heating and converting means to said vaporizing means.

2. A process for converting hydrocarbon oil to lower boiling hydrocarbon oil which comprises heating the oil in a coil to a cracking temperature under superatmospheric pressure, subjecting the heated oil to vaporization in a combined vaporizing and reflux condensing zone under reduced pressure into which vaporizing zone is passed a charging oil, separately removing vapors, reflux condensate and residue from said zone, subjecting a portion of the reflux condensate to cracking conditions of temperature and pressure in the coil, returning the cracked products to the vaporizing zone, subjecting the residue from the first vaporizing zone to vaporization in a second vaporizing zone, subjecting the vapors from the second vaporizing zone to treatment with admixed hydrogen under cracking conditions in a second coil together with another portion of the reflux from the first vaporizing zone, and returning the products of the hydrogen treatment to the first vaporizing zone.

3. A process according to claim 2 in which the materials are treated in the first coil under cracking conditions of temperature and pressure in the presence of admixed hydrogen.

WILLIAM L. GOMORY.